No. 671,349. Patented Apr. 2, 1901.
W. H. McCLURE & D. E. HEALY.
ELECTRIC SIGNALING APPARATUS.
(Application filed Dec. 8, 1899.)
(No Model.) 2 Sheets—Sheet 1.
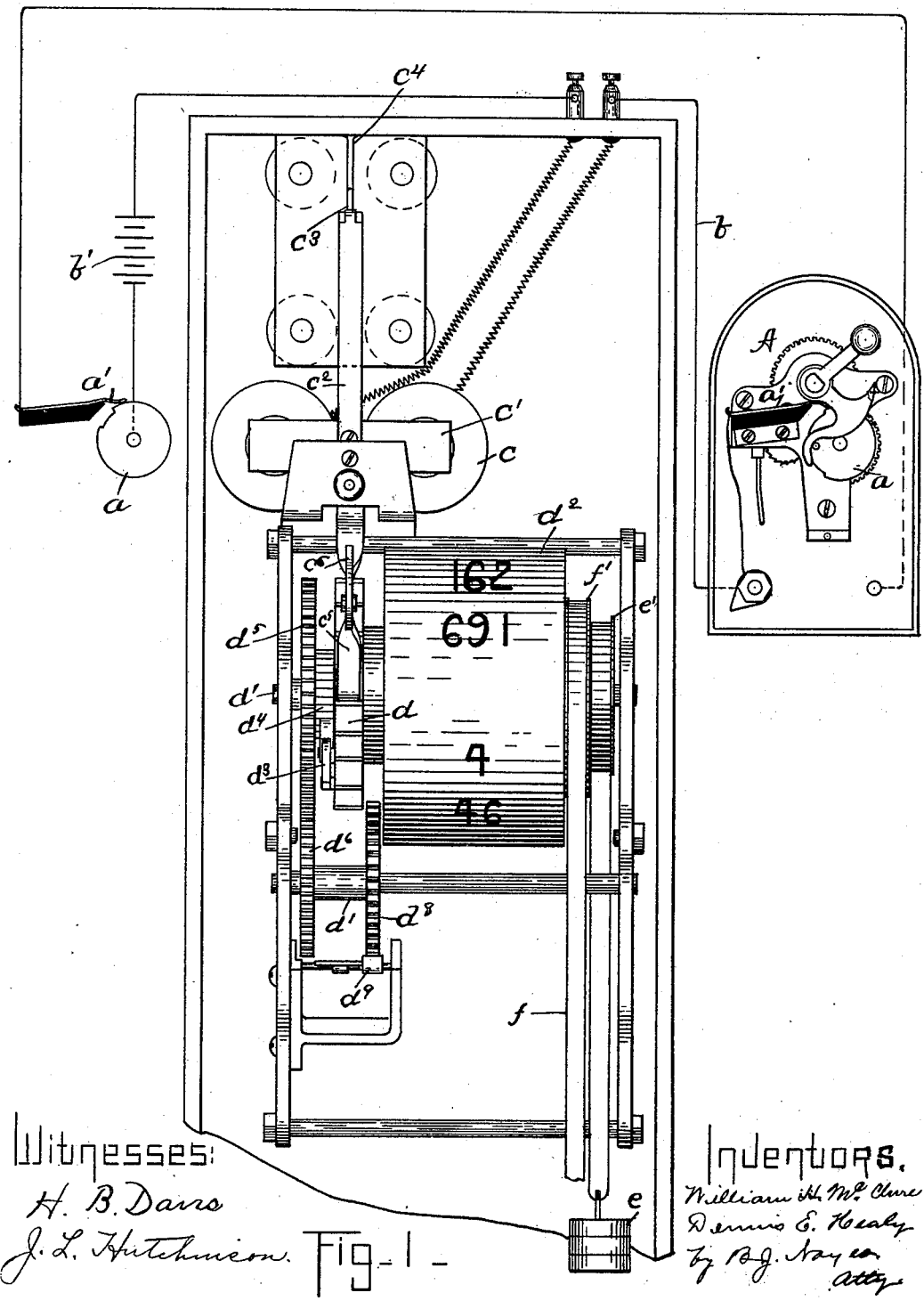

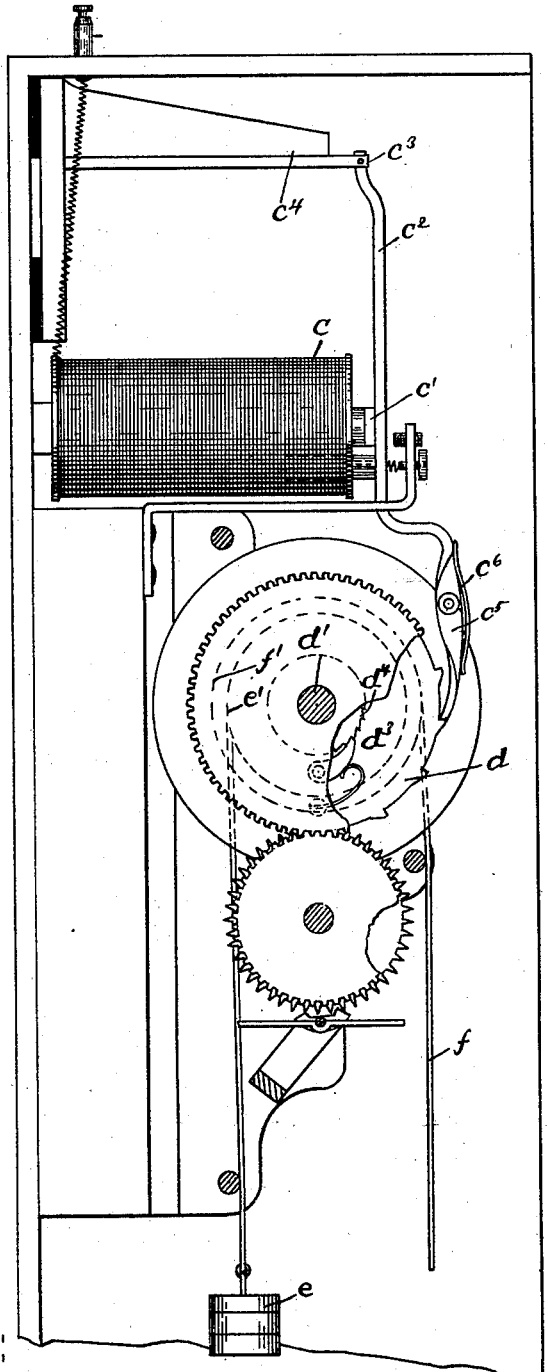

UNITED STATES PATENT OFFICE.

WILLIAM H. McCLURE AND DENNIS E. HEALY, OF WORCESTER, MASSACHUSETTS, ASSIGNORS TO GAMEWELL FIRE ALARM TELEGRAPH CO., OF NEW YORK, N. Y.

ELECTRIC SIGNALING APPARATUS.

SPECIFICATION forming part of Letters Patent No. 671,349, dated April 2, 1901.

Application filed December 8, 1899. Serial No. 739,674. (No model.)

*To all whom it may concern:*

Be it known that we, WILLIAM H. McCLURE and DENNIS E. HEALY, of Worcester, county of Worcester, and State of Massachusetts, have invented an Improvement in Electric Signaling Apparatus, of which the following description, in connection with the accompanying drawings, is a specification, like letters on the drawings representing like parts.

In connection with fire-alarm and police-signal systems electromagnetically-operated visual indicators are frequently used, which are adapted to visually indicate a code-signal representing a box-number. These instruments are very complicated, and consequently quite expensive, and they usually consist of several drums, each having upon its face a number of figures, and the several drums are operated to "set up" any one of a number of different signals, each drum showing one numeral of the box-number. In practice, however, a single instrument of this kind is rarely called upon to set up or indicate but a few numbers, in many instances no more than ten different numbers, and attempts have been made to provide an electric visual indicator especially adapted to indicate a few different code-signals and to provide suitable means for operating said indicator, whereby the different code-signals may be set up.

This invention has for its object to improve and simplify the construction of an electric visual indicator which is especially adapted to indicate a few different code-signals and to provide suitable means for operating said visual indicator, whereby the different code-signals may be set up.

In carrying out this invention a number of circuit-operating devices will be employed, which may be considered as the signal-boxes, and said circuit-operating devices are each adapted to operate the circuit of the visual indicator. The circuit-operating devices are or may be constructed in any suitable manner; but as contrasted to the ordinary circuit-operating devices employed for this purpose they are each adapted to change the normal condition of the circuit for a different period or length of time, and the visual indicator comprises, essentially, a single drum having thereon a number of code signals or indications composed of one, two, or three numerals, as the case may be, and corresponding to the numbers designating the different circuit-operating devices, and means are provided for rotating said drum, and a tripping-lever is employed, which is operated by the circuit to start and stop the drum and also to permit it to run for a length of time corresponding to the period of time that the condition of the circuit is changed by any one of the circuit-operating devices which may be operated.

Figure 1 shows in front elevation an electric signaling apparatus embodying this invention, and Fig. 2 a side elevation of the indicator.

$a$ represents a circuit-wheel, and $a'$ a contact-pen coöperating therewith, which constitutes one of the circuit-operating devices which is adapted to operate the circuit $b$ of the battery $b'$.

The circuit-wheel $a$ may be rotated in any usual or suitable manner, it being herein represented as rotated by means of a suitable motor mechanism A, which is constructed similar to the motor mechanism of an ordinary district call-box. A number of such circuit-operating devices will be provided, and the circuit-wheel $a$ of each circuit-operating device will be cut away or formed to change the normal condition of the circuit $b$ for a different period or length of time.

As herein shown, two circuit-operating devices are provided, one of which will change the normal condition of the circuit $b$ for a period of time approximately three times as long as the other; yet these two circuit-operating devices are shown merely for the sake of illustrating the invention, as it is obvious that a larger number of circuit-operating devices will ordinarily be employed.

$c$ represents the operating electromagnet of the indicator, it being included in and operated by the circuit $b$, and $c'$ represents the armature of said electromagnet, which is attached to a lever $c^2$, pivoted at $c^3$ to a suitable bracket or support $c^4$. The armature-lever $c^2$ has pivotally connected at its lower extremity a pawl $c^5$, which is held pressed by a spring $c^6$ into engagement with a toothed wheel $d$ of a motor mechanism. The toothed wheel $d$ is secured to the shaft $d'$, bearing a drum $d^2$, upon the face of which a number of code indications are placed corresponding to the code-numbers which may be used in designating the circuit-operating devices, and there will be as many code indications on the drum as there are circuit-operating devices connected with the circuit $b$. The toothed wheel $d$ carries a pawl $d^3$, which is held pressed by a spring into engagement with a ratchet-wheel $d^4$, which is secured to one side of a toothed wheel $d^5$, loosely mounted on said shaft $d'$, and said toothed wheel $d^5$ engages a toothed wheel $d^6$, which is secured to a shaft $d^7$, bearing an escape-wheel $d^8$, with which coöperates a suitable pallet $d^9$. A weight $e$ is attached by a strap or otherwise to a pulley $e'$, which is secured to the shaft $d'$, and is provided for the purpose of rotating said shaft when permitted so to do—as, for instance, whenever the pawl $c^5$ disengages the toothed wheel $d$.

The circuit $b$ is herein represented as normally closed, and consequently the armature $c'$ will be attracted and the pawl $c^5$ held in engagement with the toothed wheel $d$; but whenever the said circuit $b$ is opened and the armature retracted the toothed wheel $d$ will be disengaged, and at such time the weight $e$ will rotate the drum $d^2$. The rotary movement or action of the drum is controlled by the escapement above described and whenever released will continue to rotate until stopped by the pawl $c^5$, engaging the toothed wheel $d$, or until the weight runs down. By arranging the circuit-operating devices so that they each will operate the circuit $b$ for a different length or period of time the drum $d^2$ will be caused or permitted to rotate correspondingly different lengths or periods of time, and will consequently bring to a predetermined point the different numbers on the drum until the number corresponding to the particular circuit-operating device which has been operated has been brought to such position. To restore the drum $d^2$ to its normal position, a strap $f$ is attached to the pulley $f'$ on the shaft $d'$, which may be pulled by hand, and as the drum is thus turned backward the pawl $d^3$, carried by the toothed wheel $d$, will slip over the teeth of the ratchet-wheel $d^4$.

It is obvious that the motor mechanism herein shown for operating the drum $d^2$ may be constructed in many different ways without departing from the spirit and scope of this invention, it being only necessary to provide means for starting it whenever the normal condition of the circuit is changed and for stopping it whenever the normal condition of the circuit is restored.

We claim—

1. In an electric signaling apparatus, the combination of a number of circuit-operating devices, each adapted to change the normal condition of the circuit for a different period of time, a visual indicator operated by said circuit consisting of a drum having code indications thereon, corresponding to the different circuit-operating devices, a shaft to which said drum is secured, means for rotating said shaft, a ratchet-wheel also secured to said shaft, a pawl normally engaging it for holding said drum in its normal position, a pivoted armature-lever bearing said pawl, an electromagnet operated by the circuit for controlling the operation of said armature-lever, for disengaging and thereafter engaging said ratchet-wheel, permitting said drum to rotate, an escapement mechanism connected to said shaft by a ratchet-and-pawl connection for timing the movement of said drum, and means, as the pulley $f'$ and strap $f$, for simultaneously resetting said drum and for rewinding the actuator independent of said escapement mechanism, substantially as described.

2. In an electric signaling apparatus, the combination of a number of circuit-operating devices, each adapted to change the normal condition of the circuit for a different period of time, a visual indicator operated by said circuit consisting of a drum having code indications thereon, corresponding to the different circuit-operating devices, a shaft to which said drum is secured, means for rotating said shaft, a ratchet-wheel $d$ also secured to said shaft, a pawl normally engaging it for holding said drum in its normal position, a pivoted armature-lever bearing said pawl, an electromagnet operated by the circuit for controlling the operation of said armature-lever for disengaging and thereafter engaging said ratchet-wheel, permitting said drum to rotate, a ratchet-wheel $d^4$ loose on said shaft, a pawl engaging it carried by the aforesaid ratchet-wheel $d$, and gearing connecting said ratchet-wheel $d^4$ with an escape-wheel, and means, as the pulley $f'$ and strap $f$, for simultaneously resetting said drum and for rewinding the actuator, substantially as described.

3. In an electric signaling apparatus, the combination of a number of circuit-operating devices, each adapted to change the normal condition of the circuit for a different period of time, a visual indicator operated by said circuit consisting of a drum having code indications thereon, corresponding to the different circuit-operating devices, a shaft to which said drum is secured, a ratchet-wheel also secured to said shaft, a pawl normally engaging it for holding said drum in its normal position, a pivoted armature-lever bearing said pawl, an electromagnet operated by the circuit for controlling the operation of said armature-lever, for disengaging and thereafter engaging said ratchet-wheel, permitting said drum to rotate, an escapement mechanism connected to said shaft by a ratchet-and-pawl connection for timing the movement of said drum, and two pulleys fixed to said shaft, straps passing over said pulleys in opposite ways, a weight on one strap serving as the actuator for said shaft, the other strap serving as a restorer for said shaft and weight, substantially as described.

In testimony whereof we have signed our names to this specification in the presence of two subscribing witnesses.

W. H. McCLURE.
D. E. HEALY.

Witnesses:
WEBSTER THAYER,
FRANK B. HALL.